Figure 6:
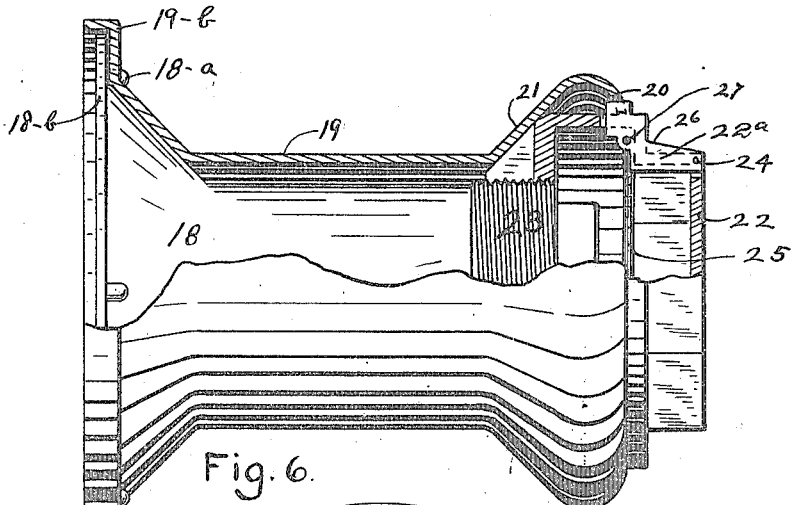

H. A. HOUSE, Jr.
LOCKING DEVICE FOR HUBS.
APPLICATION FILED AUG. 21, 1914.
1,166,130.
Patented Dec. 28, 1915
2 SHEETS—SHEET 1.
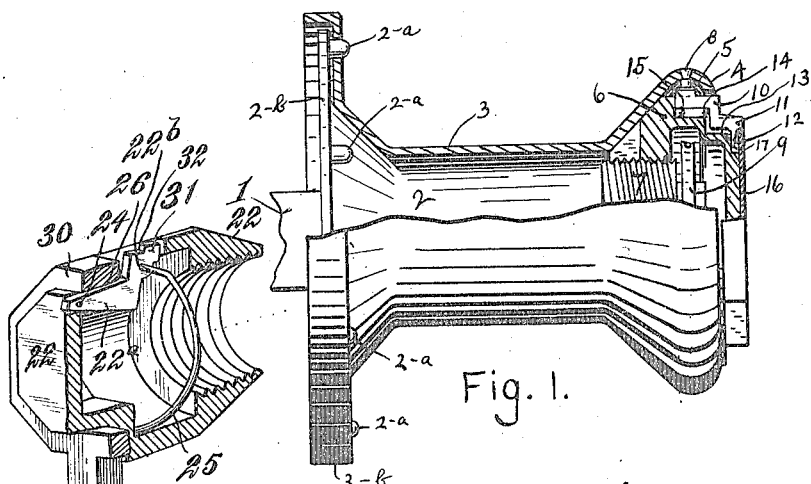
Fig. 1.
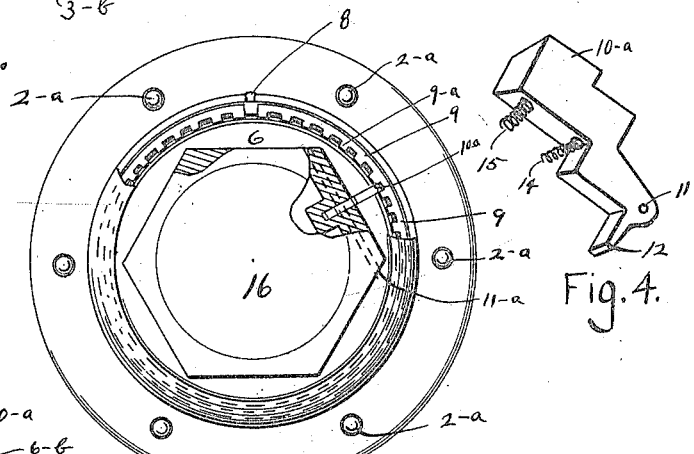
Fig. 2.
Fig. 8.
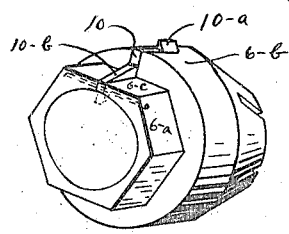
Fig. 3.
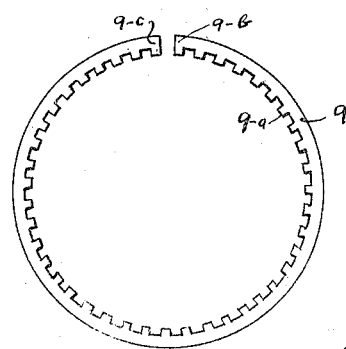
Fig. 5.
WITNESSES:
Edward F. Gingras.
Marin Britt
INVENTOR
Henry A. House Jr.
by his attorney
J. Edward Thebaud H. A. HOUSE, Jr.
LOCKING DEVICE FOR HUBS.
APPLICATION FILED AUG. 21, 1914.

1,166,130.

Patented Dec. 28, 1915.
2 SHEETS—SHEET 2.

WITNESSES:
Edward F. Gingras.
Marvin Porter

INVENTOR
Henry A. House Jr.
by his attorney,
J. Edward Theband

UNITED STATES PATENT OFFICE.

HENRY A. HOUSE, JR., OF LONG HILL, CONNECTICUT.

LOCKING DEVICE FOR HUBS.

1,166,130.

Specification of Letters Patent. Patented Dec. 28, 1915.

Application filed August 21, 1914. Serial No. 857,823.

*To all whom it may concern:*

Be it known that I, HENRY A. HOUSE, Jr., a citizen of the United States, residing at Long Hill, in the county of Fairfield and State of Connecticut, have invented certain new and useful Improvements in Locking Devices for Hubs; and I hereby declare the following to be a full, clear, and exact description of my invention, such as will enable others skilled in the art to which it appertains to make and use the same.

Reference is had to the accompanying drawings and to figures of reference marked thereon, which form part of this specification.

Like figures of reference refer to like parts.

This invention relates to ratchet devices for securing nuts to hubs of demountable vehicle wheels, and is particularly adapted for large wheels.

One feature of the invention is the releasing means which is brought into action when a wrench is put upon the nut for turning the same.

The hub of a demountable wheel is made of two parts, the inner one of which is journaled on the axle or shaft, or it may be fixed thereon. The outer hub part is fixed to the spokes and rim and is therefore removable with the wheel. Various means are in use for locking the hub parts together against turning on one another and a single nut, in threaded engagement with one of the hub parts, is used to secure the said parts longitudinally. This nut is in threaded engagement with the inner hub part and concentrically engages the outer of the said parts.

One of the objects of this invention is to provide a device that will fix the nut against unscrewing, and to automatically release the device, when applying a wrench to turn the nut.

A further object is to make the said device operative within the small space available between the nut and the outer hub part, and also to have the co-acting parts of the device separable, yet attached respectively to the nut and one of the hub parts, when the wheel is taken off.

A further object is to have the parts of said device so related in their co-action that they will follow each other in locked engagement during any eccentric movement of the nut relative to the hub parts, in a kind of floating, yet anchored or holding movement, while securing the nut against unscrewing from the inner hub part.

Inasmuch as the hub parts, when together, are secured against turning on one another, by pins or other means, we may lock the nut upon the outer of said hub parts, and it will be retained against unscrewing from the inner hub part.

For purposes of convenience and accessibility, I have made the parts of the ratchet device attached to and co-acting between the nut and the outer hub part. I provide a series of peripheral teeth adjacent to the nut, and have a pawl or tongued lever positioned for reciprocation in the nut. The pawl or tongued lever is spring pressed outward for engagement with the said teeth. The peripheral teeth may be either on a ring which engages a stud on the outer hub part, or they may be formed upon the end inturned edge of the outer hub part.

The details of construction of this invention are illustrated in the drawings, and are hereinafter described, their operation is explained and what I claim is set forth.

Figure 7:
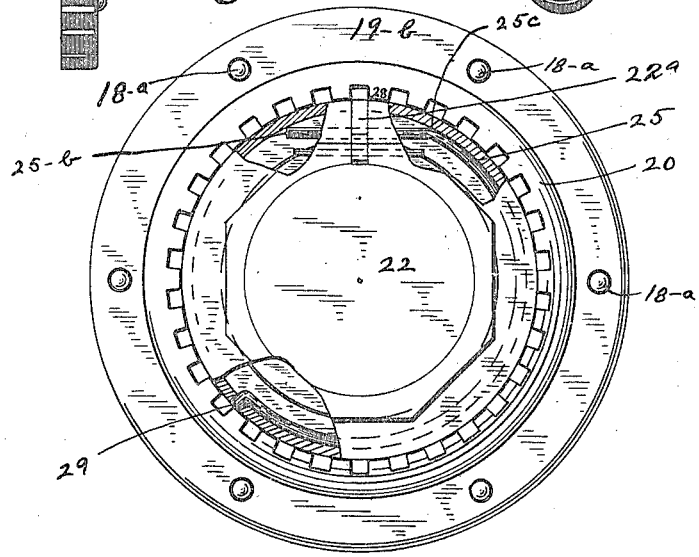

In the drawings: Figure 1 is a sectional side elevation of the hub parts and nut having the said ratchet device incorporated therewith. Fig. 2 is a sectional front elevation of that which is shown in Fig. 1. Fig. 3 is a perspective view of the conical nut showing the tongued lever or pawl incorporated therewith. Fig. 4 is a perspective view of the tongued lever. Fig. 5 is an elevation of the toothed split ring. Fig. 6 is a sectional side elevation of hub parts having incorporated therewith a modified form of the said ratchet device. Fig. 7 is a sectional front elevation of that which is shown in Fig. 6. Fig. 8 is a perspective sectional view of the nut shown in Figs. 7 and 8 and illustrates the manner in which a wrench, when applied to the nut, depresses the spring pressed pawl to free it from engagement with the teeth.

In Fig. 1, 1 is the shaft upon which is positioned the inner hub part 2. 3 is the outer hub part, having an inwardly curved end 4, forming an annular space 5, with the conical nut 6, which is in threaded engagement at 7, with the inner hub part 2. 2ª are studs fixed upon the flange 2ᵇ, of the inner hub part 2, and are in engagement with holes in the flange 3ᵇ of the outer hub part 3, to prevent the hub parts 2 and 3 from turning on one another. 8 is a stud fixed with the end 4 of the outer hub part 3. 9 is a toothed ring which is split, so that its free ends (not shown in this figure) are in engagement with the stud 8, to prevent the ring 9 from turning within the end 4 of the outer hub part 3. 10 is the tongued lever pivoted at 11 to the nut 6. Upon the tongued lever 10 is the finger 12 which engages a shoulder 13 formed within the nut 6, to limit the outward movement of the tongued lever 10, due to the compression springs 14 and 15. 16 is a plate upon the nut 6, which extends over the recess 17, occupied by the finger 12.

In Fig. 2, is shown the beveled tongue 10ᵃ in engagement with one of the teeth 9ᵃ of the ring 9. In this figure are shown the ends 9ᵇ and 9ᶜ of the ring 9 positioned for engagement with the stud 8.

In Fig. 3, the tongued lever 10 is shown pivoted to the hexagonal head 6ᵃ by means of the pin 11ᵃ. The beveled tongue 10ᵃ is shown projecting above the peripherial surface 6ᵇ of the nut 6. A beveled part 10ᵇ of the tongued lever 10, is shown to project above the flat surface 6ᶜ of the head 6ᵃ.

In Fig. 4, is shown the position of the springs 14 and 15 which project from pocketed holes in the body of the tongued lever 10 and also is shown the relative positions of the beveled tongue 10ᵃ and the finger 12.

In Fig. 5, is shown the split ring 9 having internal teeth 9ᵃ.

In Fig. 6, 18 is the inner hub part. 19 is the outer hub part, having an inwardly curved end 20, and a conical part 21, which is in engagement with the conical end of the nut 22. The nut 22 is in threaded engagement at 23, with the inner hub part 18. 18ᵃ are studs fixed upon the flange 18ᵇ of the inner hub part 18, and are in engagement with the holes in the flange 19ᵇ of the outer hub part 19, to prevent the hub parts 18 and 19 from turning on one another. The edge of the inner curved end 20 is toothed as shown in Fig. 7. Adapted for engagement with the teeth is the tongued lever or pawl 22ᵃ, pivoted within the slot on the nut 22 at the pin 24. The spring coil 25 passes through a hole 27 in the pawl 22ᵃ to engage the pawl to govern its outward movement, between the teeth in the end 20.

In Fig. 7, teeth marked 28, are shown cut in the end 20 of the outer hub part 19. The spring coil 25 is shown to fit against the inner curved surface of the nut 22 until it is within the vicinity of pawl 22ᵃ. The portion 25ᵃ of the spring coil 25 is straight so that its end 25ᵇ and the shoulder 25ᶜ, form a stop to limit the outward movement of the pawl 22ᵃ. The lower end of the spring coil 25 is bent outward to engage a hole at 29 in the nut 22.

In Fig. 8, the nut 22 is shown in section, and illustrates how the beveled surface 26 of the pawl 22ᵃ, is depressed by engagement with the wrench 30, whereby the tongue 31, of the pawl or tongued lever 22ᵃ, is submerged below the periphery of the nut 22, at the point 32. A portion of the spring coil 25, engages a hole in the pawl 22ᵃ, at 27, as is clearly shown, the pawl 22ᵃ being pivoted on the pin 24.

In operation, referring to Fig. 2, if the nut 6 is turned clockwise, the beveled tongue 10ᵃ will pass consecutively over the teeth 9ᵃ and coming to rest in some such position as that shown, will be prevented from turning backward by means of the engagement of the radial surface of the tongue 10ᵃ, with one of the teeth 9ᵃ adjacent thereto. The engagement of the tongued lever 10, to the ring 9, in the act of preventing the back turning of the nut 6 will cause the ring end 9ᶜ to press against the stud 8. The illustration shows the device adapted for right threaded nut. For a left threaded nut, the only change necessary is to reverse the bevel on the tongue 10ᵃ.

When it is desired to unscrew the nut 6, a wrench adapted to fit the head 6ᵃ is pressed into engagement therewith and depresses the beveled part of 10ᵇ of the lever 10, thereby causing the tongue 10ᵃ to be thrown out of engagement with the teeth 9ᵃ of the ring 9. When the wrench is removed, the springs 14 and 15 shown in Figs. 1 and 4, act to throw out the tongue 10ᵃ to engage the teeth 9ᵃ and prevent the reverse turning of the nut 6. Any eccentric movement of the nut 6, will not disturb the engagement of the tongue 10ᵃ with the teeth 9ᵃ on account of the strong action of the tongued lever 10, to cause the tongue 10ᵃ to follow the teeth 9ᵃ.

When the wrench 30, shown in Fig. 8, is applied to the nut 22, the nut 22 being in place as shown in Figs. 6 and 7, the pawl 22ᵃ will be out of engagement with the teeth 28, and the nut can be turned in either direction, as explained above with reference to the lever 10.

The modified form of my device shown in Figs. 6, 7 and 8, dispenses with the ring shown in Fig. 5, yet the pawl 22ᵃ has a beveled surface 26 adapted for the same purposes as the beveled surface 10ᵇ shown in Fig. 4.

The construction of the device herein shown may be modified yet not depart from the spirit of my invention. Hence, I do not wish to be confined to the details of parts illustrated.

Having described my invention, I claim,

1. In a demountable wheel, having a hub composed of two separably co-fitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said nuts together, said device consisting of a spring pressed tongue pivoted to said nut and positioned for a swinging movement substantially in a radial plane containing the axis of said hub, and toothed means on the outer of said parts, adapted for locking engagement with said tongue.

2. In a demountable wheel, having a hub composed of two separably co-fitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said parts together, said device consisting of a spring pressed tongue pivoted to said nut and adapted to swing thereon, substantially in a radial plane passing through the axis of said hub, means upon said outer hub part adapted for locking engagement with said tongue, said tongue having a beveled portion extending above the outer surface of said nut, for depressing engagement with a wrench fitted to said nut to release the same.

3. In a demountable wheel, having a hub composed of two separably co-fitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said parts together, said device consisting of a spring pressed tongue pivoted to said nut and adapted to swing substantially in a radial plane passing through the axis of said hub, means upon said outer hub part adapted for ratchet engagement with said tongue, said tongue having a beveled outer portion extending above the outer surface of said nut and adapted for depressing engagement with a wrench when used in turning said nut whereby said tongue is released from locking engagement with said means, leaving said nut free to be turned in either direction.

4. In a demountable wheel, having a hub composed of two separably co-fitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, a locking device adapted to hold said nut in position where screwed to hold said parts together, said device comprising an internally toothed means positioned between said nut and said outer hub part and fixed against turning therein, a spring pressed lever pivoted to said nut to swing in a longitudinal and radial slot therein, and an external projection on said lever, extending above the outer surface of one of the flat longitudinal faces of said nut, adapting the same for depressing engagement with a wrench, to release said lever from said means, when applying said wrench to turn said nut.

5. In a demountable wheel, having a hub composed of two separably co-fitting parts, one within the other, the inner of said parts being adapted to engage a shaft concentrically, the said parts having means to resist the turning of one on the other of said parts, when assembled, and having a nut in threaded engagement with one of said parts and adapted to hold said parts together longitudinally, there being an annular space between said nut and the outer of said hub parts, a locking device consisting of a stud fixed to said outer hub part and projecting within said annular space, an internally toothed split ring positioned within said annular space to have its ends adapted to engage said stud to resist any rotative movement of said ring within said outer hub part, a lever pivoted on said nut to swing radially in a longitudinal slot thereon, said lever having a beveled tongue adapted for ratchet engagement with the teeth of said ring, a spring engaging said lever and said nut adapted to throw the said lever outward from said nut into engagement with the teeth of said ring and means on said nut adapted to limit the outward movement of said lever.

HENRY A. HOUSE, Jr.

Witnesses:
RENA F. HOUSE,
HAROLD F. TOUSEY.